Nov. 24, 1931.　　　J. G. PARKHURST　　　1,833,791
CASING FOR ELECTRIC WATER HEATERS
Filed May 26, 1930
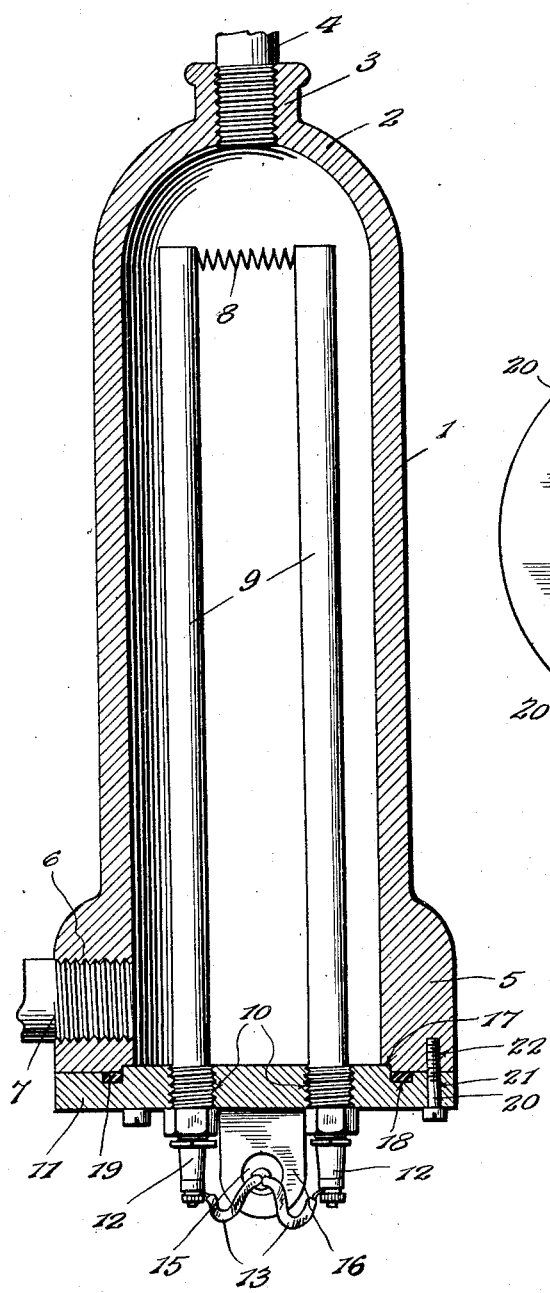
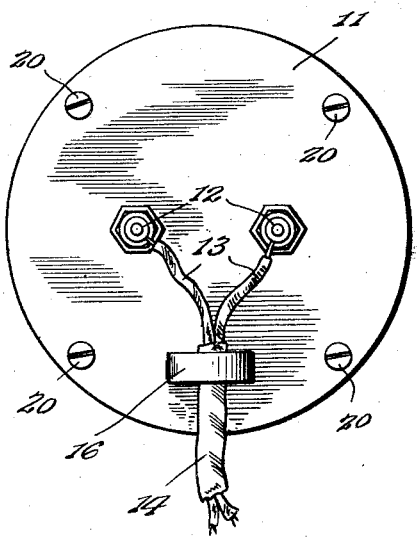
Inventor
J. G. Parkhurst.
By Lacey & Lacey,
Attorneys Patented Nov. 24, 1931

1,833,791

UNITED STATES PATENT OFFICE

JOHN G. PARKHURST, OF TACOMA, WASHINGTON

CASING FOR ELECTRIC WATER HEATERS

Application filed May 26, 1930. Serial No. 455,817.

This invention relates to water heaters and more particularly to a casing for a water heater of the electrically operated type.

One object of the invention is to provide the heater casing with a bottom carrying the heating unit and so connected with the walls of the casing that while the bottom will be firmly secured it may be very easily released when it is necessary to remove the bottom in order to have access to the interior of the casing and make repairs or replacements to the heating unit or remove sediment from the bottom of the heater.

Another object of the invention is to not only permit the bottom to be very firmly secured to the walls of the casing but at the same time permit a watertight joint to be formed between the bottom and walls of the casing and also prevent the bottom from having transverse movement when applied to the casing.

Another object of the invention is to so form the removable bottom and the lower portions of the casing walls to which the bottom is applied that when securing screws for the bottom are set in place and tightened there will be no danger of the walls of the casing being cracked.

The invention is illustrated in the accompanying drawings, wherein

Figure 1 is a vertical sectional view through the improved water heater,

Figure 2 is a view looking at the under face of the removable bottom.

The improved water heater is of the vertically disposed type and its casing 1 may be of any desired height and diameter. Its upper portion or top 2 is substantially hemispherical in shape and terminates in an internally threaded neck 3 to receive a pipe 4 constituting an outlet pipe for the heater. This casing is open at its bottom and the lower portion 5 of its wall has been externally thickened for the entire circumference of the casing. At one side of the casing the thickened lower portion thereof is formed with a threaded opening 6 to receive an inlet pipe 7. By this arrangement water enters the lower portion of the heater and moves upwardly through the same during which movement it is heated by the heating unit within the casing. The heating unit consists of a coil 8 led through a suitable number of pipes disposed vertically in the casing. Two of these pipes which are indicated by the numeral 9 have been shown in the casing and these pipes have their lower ends threaded and engaged through threaded openings 10 formed in a removable bottom 11 of the casing. At their lower ends the tubes or pipes 9 carry terminals 12 for the coils 8 and these terminals are engaged by feed wires 13 shielded by a covering of insulation 14 and passed through an opening 15 formed in a depending ear 16 carried by the casing bottom. It will thus be seen that the power wires will be supported and will not be liable to work loose from the terminals of the heating unit.

The bottom 11 which fits against the lower end of the casing is formed of strong metal and consists of a disc corresponding in diameter to the lower end of the casing. This bottom has its marginal portions reduced in thickness from its upper face in order to define a thickened intermediate portion which fits into a circumferentially extending recess or seat 17 formed in the wall of the casing and about its inner circumference the reduced marginal portion of the bottom is formed with a circumferentially extending recess or groove 18 into which is fitted a packing ring 19. This packing ring is preferably formed of resilient material such as rubber although any suitable packing material may be employed and the ring is originally of sufficient thickness to project upwardly above the reduced marginal portion of the bottom. Therefore when the bottom is applied to the casing and securing screws 20 pass through openings 21 formed in the bottom and engage in threaded sockets 22 formed in the thickened portion of the casing wall and tightened the packing will be compressed as the bottom is drawn tightly into place and a tight joint formed. When it is desired to remove the bottom in order to make repairs or replacements to the heating unit or remove mud and other sediment from the bottom of the casing it is merely necessary to remove the screws and the entire bottom 11 will be released and can be removed from the casing together with the heating unit. I have therefore provided a water heater which is simple in construction and has a bottom adapted to be very firmly secured but permitted to be easily and quickly removed when necessary. It should be further noted that since the lower portions of the casing wall are thickened a wide contact surface is provided and in addition there will be no danger of the casing wall becoming cracked when the securing screws are tightened.

Having thus described the invention, I claim:

In an electric water heater, a casing open at its bottom and having its walls thickened about its lower end to form a reinforced lower portion for the casing, said casing having an opening in its top and an opening near its lower end to receive circulating pipes, the lower end of the casing being recessed from its inner annular edge to form an internal annular seat, a bottom for said casing fitting against the lower edges of the walls of the casing and having a thickened central portion seated in said recess and fitting snugly therein, a circumferentially extending groove being formed in the upper face of the bottom about margins of its thickened central portion, packing in said groove to form a tight joint between the bottom and walls of the casing, securing screws engaged through openings formed in marginal portions of the bottom and engaged in threaded sockets formed in the thickened lower end of the walls of the casing to releasably secure the bottom to the walls of the casing, and heating means carried by said bottom and projecting upwardly therefrom into the casing.

In testimony whereof I affix my signature.

JOHN G. PARKHURST. [L. S.]